United States Patent
Namaky et al.

(10) Patent No.: US 7,069,125 B2
(45) Date of Patent: Jun. 27, 2006

(54) CODE READER DISPLAY

(75) Inventors: Hamid Namaky, South Russell, OH (US); Robert A. Roberts, South Euclid, OH (US)

(73) Assignee: SPX Corporation, Charlotte, NC (US)

( * ) Notice: Subject to any disclaimer, the term of this patent is extended or adjusted under 35 U.S.C. 154(b) by 546 days.

(21) Appl. No.: 10/201,538

(22) Filed: Jul. 23, 2002

(65) Prior Publication Data

US 2003/0176957 A1 Sep. 18, 2003

Related U.S. Application Data

(60) Provisional application No. 60/364,705, filed on Mar. 15, 2002.

(51) Int. Cl.
*G06F 19/00* (2006.01)

(52) U.S. Cl. .................. 701/29; 455/67.11; 455/457
(58) Field of Classification Search ............. 701/29–33; 455/67.11, 457
See application file for complete search history.

(56) References Cited

U.S. PATENT DOCUMENTS

| D263,808 S | 4/1982 | Tanaka |
| D269,165 S | 5/1983 | Driscoll |
| D271,950 S | 12/1983 | Moore |
| D276,844 S | 12/1984 | Eaton |
| D289,621 S | 5/1987 | Tanaka et al. |
| D290,097 S | 6/1987 | Baumann et al. |
| D323,129 S | 1/1992 | Dulaney et al. |
| D346,759 S | 5/1994 | Job et al. |
| D368,493 S | 4/1996 | Boes et al. |
| D418,826 S | 1/2000 | Pavely et al. |
| D422,545 S | 4/2000 | Palalau et al. |
| D428,397 S | 7/2000 | Palalau et al. |
| D445,745 S | 7/2001 | Norman |
| D447,435 S | 9/2001 | Thomas |
| 6,611,740 B1 * | 8/2003 | Lowrey et al. ............... 701/29 |
| 6,687,584 B1 | 2/2004 | Andreasen et al. |
| 6,732,031 B1 * | 5/2004 | Lightner et al. ............. 701/33 |
| 6,757,521 B1 * | 6/2004 | Ying ....................... 455/67.11 |

* cited by examiner

*Primary Examiner*—Thomas G. Black
*Assistant Examiner*—Ronnie Mancho
(74) *Attorney, Agent, or Firm*—Baker & Hostetler LLP

(57) ABSTRACT

An improved code reader for reading and displaying OBD II diagnostic codes. The code reader displays textual diagnosis descriptions corresponding to diagnostic codes. Although the code reader preferably has a display having fewer available display characters than the number of characters in the OBD II textual diagnosis descriptions, the code reader can display both an OBD II code and the textual diagnosis description corresponding to a selected OBD II code. This is accomplished using code giving the appearance that the textual diagnosis description corresponding to the selected OBD II code is either streaming on the display or scrolling on the display.

25 Claims, 4 Drawing Sheets

CODE READER DISPLAY

CROSS-REFERENCE TO RELATED APPLICATIONS

This application claims priority to U.S. provisional application Ser. No. 60/364,705, filed on Mar. 15, 2002, and entitled IMPROVED OBD II CODE READER DISPLAY, which is hereby incorporated by reference in its entirety.

FIELD OF THE INVENTION

The present invention relates generally to the field of electronic testing devices, and more specifically to a code reader having an improved display.

BACKGROUND OF THE INVENTION

Modern vehicles typically have a vehicle diagnostic system, typically having one or more separate computer control modules. Examples of such computer control modules (also known as just "modules") are: a powertrain control module (PCM), an engine control module (ECM), a transmission control module (TCM), an ABS control module, and an air bag control module.

"Off-board devices," such as scan tools, are known in the art and are testing devices that interface with vehicle diagnostic systems to, e.g., access, display, and/or print vehicle diagnostic information. OBD II (On-Board Diagnostics version II) Scan Tools are one commonly known type of scan tool and are governed by a number of standards, e.g., SAE J1978 Rev. 1998-02 and SAE J1979 Rev. 1997-09. Scan tools are relatively expensive diagnostic devices that have a relatively large number of features and are typically marketed to professional automobile mechanics and service stations. Scan tools are generally considered to be beyond the means of most automobile hobbyists and the ordinary individual interested in performing simple maintenance or service of a few vehicles, such as a family "fleet" of vehicles.

There are different types of scan tools. An "OBD II Scan Tool" complies with the above-identified specifications. By contrast, a "Manufacturer-Specific Scan Tool" is a scan tool that accesses and displays proprietary manufacturer-specific data (and possibly also additionally accesses and displays OBD II data). Examples include Device Controls on General Motors, On-Demand Tests in Ford, Actuator Tests, Sensor Tests, Interrogator, Read Temporary Codes in Chrysler. In general, air bag data, ABS data, cruise control data, and climate control data are also considered to be proprietary manufacturer-specific data and are typically included only in Manufacturer-Specific Scan Tools.

Another "off-board device" that is a low-cost alternative to the scan tool is a "code reader." In 1998 Actron Manufacturing Corp., the assignee of the present invention, pioneered the first OBD II code reader. In contrast with a scan tool, a code reader is a relatively basic "off-board device" that links with one or more computer modules in a vehicle diagnostic system via a vehicle computer network, reads any diagnostic trouble codes (also referred to as just "diagnostic codes" herein) asserted by those vehicle diagnostic systems, and displays any diagnostic codes on a display. Typical code readers do not perform the following major functions that are performed by typical scan tools: "View Data," also known as "Live Data," "Data," and "Data Test, DTC" (viewing and displaying in real-time live, changing data from a plurality of module sensors), display of textual diagnosis descriptions corresponding to the various diagnostic codes, recording and playback of data, device control (manually controlling modules for diagnostic purposes), and reading and displaying vehicle information from the vehicle's computer (e.g., VIN information, controller calibration identification number, etc.). Code readers are typically marketed to automobile hobbyists and non-professionals who are merely curious about what codes the various vehicle diagnostic systems have stored in their memories.

As used here, an "OBD II Scan Tool" is significantly different from a manufacturer-specific "scan tool." A given off-board device might be a scan tool but not an OBD II Scan Tool, because it does not meet applicable specifications. Also, as used herein, a "scan tool" is significantly different from a "code reader." The "live data" function, i.e., the ability to view and display real-time live data from a plurality of various different sensors (and other information derived from sensor data) is a very important feature of scan tools, and can be used to distinguish a scan tool from a code reader. Thus, as used herein, the term "scan tool" means an off-board device that (a) obtains and displays vehicle diagnostic trouble codes (preferably but not necessarily OBD II DTCs) from a vehicle diagnostic system and (b) obtains and displays in real-time live, changing vehicle diagnostic data from a plurality of modules representing either (i) sensor data or (ii) information derived from sensor data. Similarly, as used herein, the term "code reader" means an off-board device that (a) does obtain and display vehicle diagnostic trouble codes (preferably but not necessarily OBD II DTCs) from a vehicle diagnostic system and (b) does not obtain and display in real-time live, changing vehicle diagnostic data from a plurality of modules representing either (i) sensor data or (ii) information derived from sensor data. By way of example, but not of limitation, examples of sensor data and information derived from sensor data are (1) calculated load value (e.g., SAE J1979 9/97 PID 04H), (2) engine coolant temperature (e.g., PID 05H), (3) engine RPM (e.g., PID 0CH), (4) absolute throttle position (e.g., PID 11H), (5) intake air temperature (PID 0FH), and (6) oxygen sensor data (e.g., at least one of PID 14H through 1BH). The reading and display of malfunction indicator light (MIL) status, even if obtained and displayed live, in real-time, would not be considered to be "live data" and would not, by itself, make an off-board device be considered to be a scan tool, because illumination of MIL indicates that there is a code available in on of the modules and does not represent either (i) sensor data or (ii) information derived from sensor data. By way of further example, on the one hand an off-board device that obtains and displays vehicle diagnostic trouble codes from a vehicle diagnostic system and that obtains and displays in real-time live, changing vehicle diagnostic data representing one or more of the six above-listed parameters (or other data representing sensor data or information derived from sensor data) is a scan tool. On the other hand, an off-board device that obtains and displays vehicle diagnostic trouble codes from a vehicle diagnostic system and that does not obtain and display in real-time live, changing vehicle diagnostic data representing one or more of the six above-listed parameters (or other data representing sensor data or information derived from sensor data) is a code reader and not a scan tool, even if it displays MIL status.

One typically uses a code reader when a vehicle malfunction indicator light ("MIL") (e.g., the "Check Engine" light) on the dashboard of a vehicle is illuminated. In response to the illumination of such a light, e.g., a "Check Engine" display, the user connects an code reader to the vehicle diagnostic connector, presses a first button (e.g., a READ or LINK button) or activates a menu-driven function, which causes the code reader to (i) establish communications with the various modules in a vehicle diagnostic system using a communications protocol, (ii) read any codes which are stored in the vehicle's computer modules in the vehicle diagnostic system, and (iii) display one or more vehicle diagnostic codes via a display. The user then uses a reference manual to determine the nature of the diagnosis corresponding to each diagnostic code.

For example, the ACTRON® CP9035 code reader, generally recognized as the first OBDII code reader, has three buttons, a READ button, an ERASE button, and an arrow button, four LEDs, labeled "Power Train," "Body," "Chassis," and "Uart," and a four-digit seven-segment LED numeric display. When an indicator light is illuminated, or just to see if any diagnostic codes are available, a user will connect the connector of the code reader to the connector for the vehicle diagnostic system network. The CP9035 code reader is powered by the vehicle being tested. The user initiates the link and read process by pressing the READ button, which causes the CP9035 to (i) establish communications with vehicle computer modules in the vehicle diagnostic system using a communications protocol, (ii) read any codes which are stored in vehicles computer modules in the vehicle diagnostic system, and (iii) display the first vehicle diagnostic code via an LED and the numeric display. The other codes are displayed in turn by pressing the arrow button. The codes are erased by pressing the ERASE button.

Although scan tools display OBD II and/or manufacturer-specific textual diagnosis descriptions, with the much simpler code readers, the user must manually determine the nature of the codes. For example, if five codes are displayed 0743, 0443, 0118, 0113, and 1490, all with the "Power Train" LED illuminated, then the user would understand that the CP9035 code reader had read the following codes from the vehicle diagotsic system: P0743, P0443, P0118, P0113, and P1490. In response, the user would open the manual, and read the corresponding descriptions. Relevant portions of the manual read:

| | |
|---|---|
| P0113 | Intake Air Temperature Circuit High Point |
| P0118 | Engine Coolant Temperature Circuit High Input |
| P0443 | Evaporative Emission Control System Purge Control Valve Circuit Malfunction |
| P0743 | Torque Converter Clutch Circuit Electrical |
| P1490 | Low Speed Fan Control Relay Circuit | allowing the user to manually determine the respective diagnosis corresponding to each diagnostic code. This process of manually reading the OBD II and/or manufacturer-specific textual diagnosis descriptions can be time-consuming and, of course, is subject to human error.

Thus, although code readers provide an inexpensive way to permit one to read OBD II and/or manufacturer-specific codes from vehicle diagnostic systems, there is a need for an improved code reader.

SUMMARY OF THE INVENTION

The present invention is directed toward an improved low-cost code reader having an improved display in which manufacturer-specific textual diagnosis descriptions corresponding to diagnostic codes (preferably but not necessarily OBD II diagnostic trouble codes) are displayed to a user.

The present invention is also directed toward an improved code reader having an improved display in which OBD II and/or manufacturer-specific textual diagnosis descriptions are presented to the user on a display that has fewer display characters than the number of characters in the OBD II and/or manufacturer-specific textual diagnosis descriptions being displayed. This is accomplished by either presenting an automatically streaming or scrolling display and/or by presenting the user with a user interface that permits the user to manually scroll or stream the display.

It is therefore an advantage of the present invention to provide an improved code reader that displays textual diagnosis information on a display having fewer characters than the textual diagnosis.

It is also an advantage of the present invention to provide an improved code reader that has a display that automatically streams or scrolls to present alphanumeric information on a display having fewer characters than the alphanumeric information.

It is another advantage of the present invention to provide an improved code reader that has a display and a user interface that permits a user to manually stream or scroll alphanumeric information on a display having fewer characters than the alphanumeric information being presented.

It is yet another advantage of the present invention to provide an improved code reader that displays textual diagnosis information corresponding to a diagnostic code.

It is still another advantage of the present invention to provide an improved cod reader that displays textual diagnosis information corresponding to an OBD II and/or manufacturer-specific diagnostic code.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein.

DETAILED DESCRIPTION OF THE INVENTION

Figure 1:
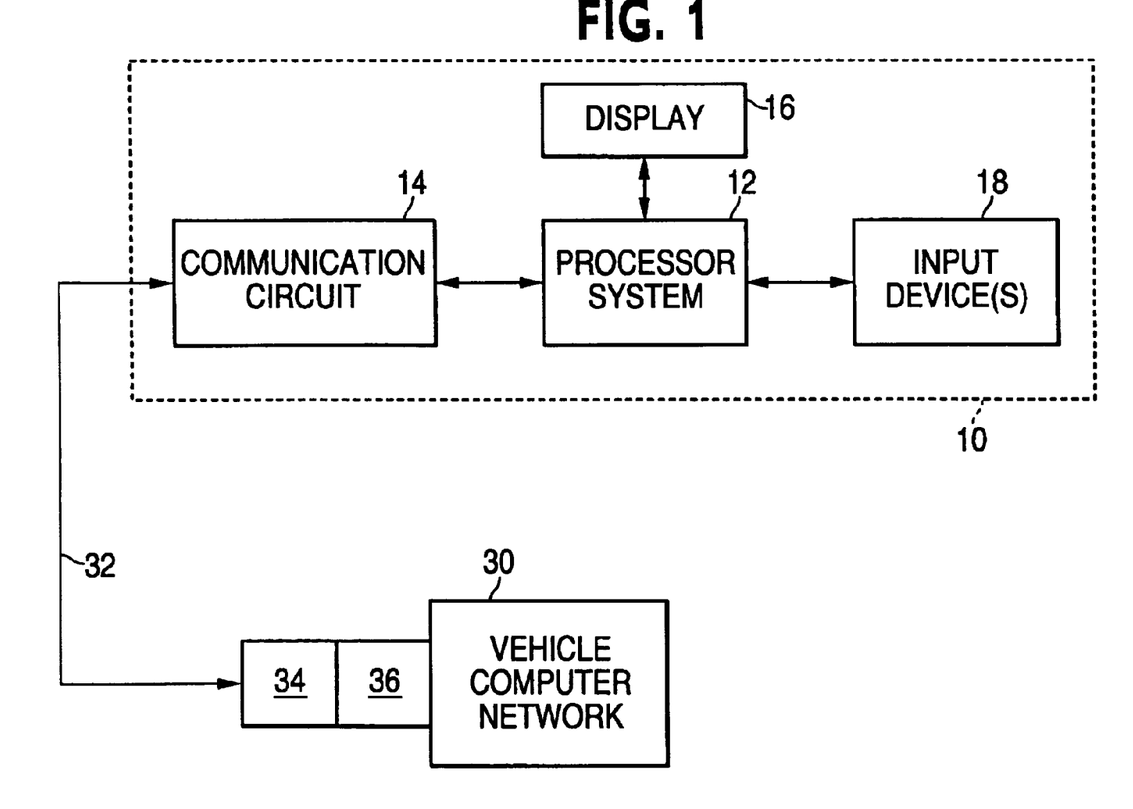
FIG. 1 is a high-level block diagram of a code reader according to the present invention.

Referring to FIG. 1, a high-level block diagram of both a typical code reader and a code reader 10 of the present invention is shown. Such a code reader 10 comprises a processor system 12 in circuit communication with a communication circuit 14, a display 16, and one or more input devices 18.

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, e.g., a CPU, are in circuit communication.

The code reader 10 is placed in circuit communication with a vehicle computer network 30 having one or more interconnected computers ("modules" as discussed above) via a connection link carried by a communication cable 32. The connection cable 32 typically has a connector 34 affixed thereto that connects to a mating connector 36 in circuit communication with the vehicle computer network 30.

The processor circuit 12, also referred to herein as just processor 12, may be one of virtually any number of processor systems and/or stand-alone processors, such as microprocessors, microcontrollers, and digital signal processors, and has associated therewith, either internally therein or externally in circuit communication therewith, associated RAM, ROM, EPROM, EEPROM, clocks, decoders, memory controllers, and/or interrupt controllers, etc. (all not shown) known to those in the art to be needed to implement a processor circuit.

The communications circuit 14 typically generates one or more communications protocols with which the code reader 10 and the vehicle computer network 30 communicate with one-another. The communications circuit 14 can be implemented either in hardware, or in software, or in a combination of hardware and software. Communication circuit 14 preferably generates a communications link consistent with any one or more of the following protocols: SAE J1850 (VPM), SAE J1850 (PWM), ISO 9141-2, ISO 14230-4 ("Keyword 2000"), and Controller Area Network ("CAN") (ISO 15765-4). The present invention is not intended to be limited to any specific protocol, or even to electrical communications protocols. Other present and future protocols, such as fiber optic and wireless communications protocols, are also contemplated as being within the scope of the present invention.

The display 16 can be one or more of virtually any type of display, e.g., textual displays (such as n character by m line LCD or plasma displays, etc.), binary displays (such as LEDs, lamps, etc.), graphical displays (such as LCD displays that can display text and bar graphs and the like), etc. That said, the display 16 of the present invention preferably but not necessarily has limited display capabilities, i.e., has fewer available character display locations than the information that is to be communicated at various points in time. For example, several ODB II textual diagnostic descriptions have more than 130 alphanumeric characters and the display of the present invention has significantly fewer alphanumeric display characters available for display of those textual diagnostic descriptions ("diagnoses"), e.g., a 1×16 LCD display having 16 display characters, a 1×20 LCD display having 20 display characters, a 2×16 LCD display having 32 display characters, or a 2×20 LCD display having 40 display characters. The input device(s) typically comprise one or more keys or a keyboard, but may be one or more of virtually any type of input device, such as touch screens, etc. In addition, one or more optional additional storage devices (not shown) can be placed in circuit communication with the processor system 12 and can comprise, for example, cartridge memories (such as those containing EPROM, EEPROM, or Flash PROM memories), PC cards, stick memories (such as SONY brand MEMORY STICK packaged memory semiconductors), so-called floppy diskettes, etc.

The processor 12 typically executes a computer program stored in its RAM, ROM, Flash memory, and/or its EPROM (all not shown) and/or stored in any of the additional storage devices, if any, using data stored in any one or more of those memories. For example, the processor 12 may execute a computer program from an EEPROM (not shown) using data (e.g., OBD II diagnostic codes or textual descriptions of diagnostic codes) stored in a cartridge memory. In general, the computer program executed by the processor in typical code readers initializes the code reader and generates a user interface (e.g., using the input device(s) 18), through which a user causes the code reader to communicate with the vehicle computer network 30 to read certain data (diagnostic codes) from the vehicle computer network 30, format such read data, and display the formatted data on the display 16. At this high level, the code reader 10 according to the present invention works the same: the computer program executed by the processor 12 initializes the code reader 10 and generates a user interface (e.g., using the input device(s) 18), through which a user causes the code reader 10 to communicate with the vehicle computer network 30 to read certain data from the vehicle computer network 30, format such read data, and display the formatted data on the display 16. A fundamental difference in the present invention is how the code reader 10 of the present invention formats the data and displays the data. The known code readers merely display the alphanumeric diagnostic codes themselves. The code reader according to the present invention displays the textual diagnosis descriptions corresponding to the diagnostic codes.

Figure 2:
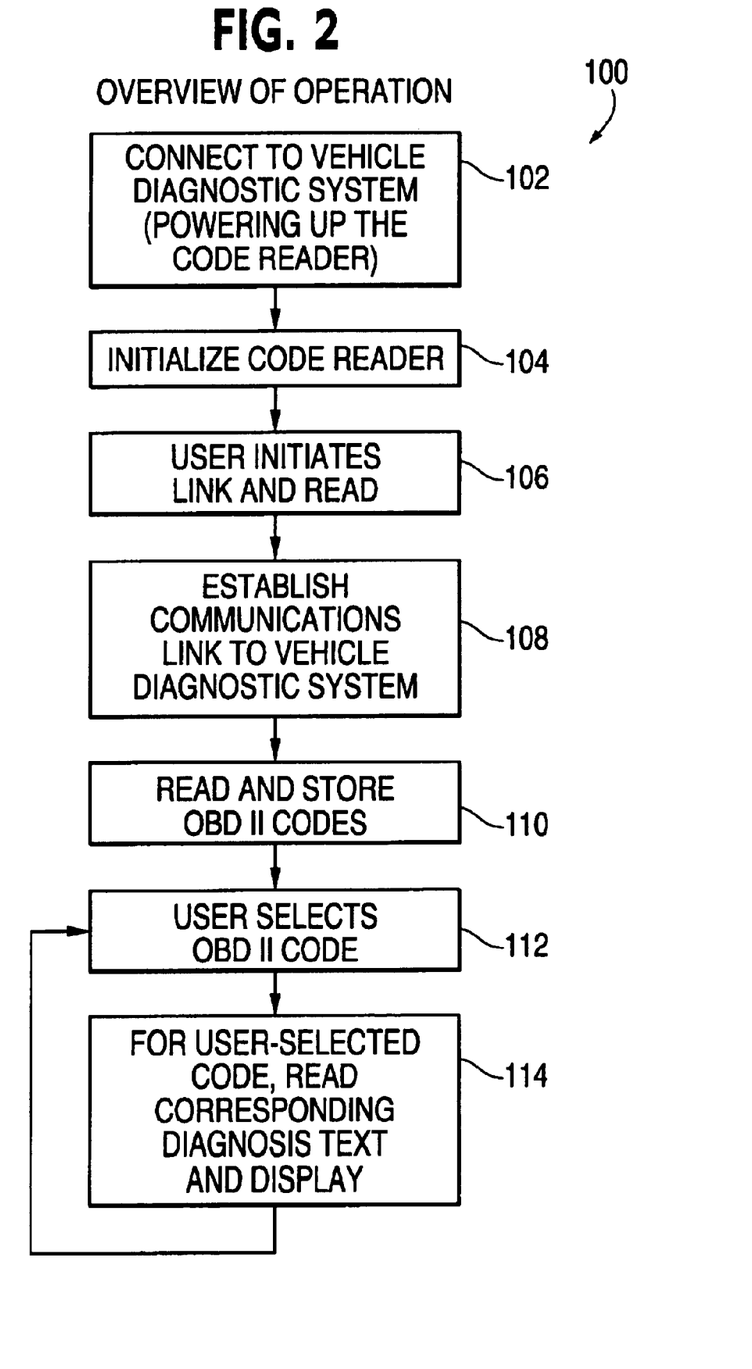
FIG. 2 is a high-level flow chart showing the operation of a code reader according to the present invention.

FIG. 2 is a high-level flow chart 100 showing an overview of the code executed by processor 12 in operation of the code reader 10. Of course, the code reader 10 must be connected to the vehicle computer network 30 via a suitable cable 32 or other communications medium, e.g., fiber optic or wireless medium. Thus, first, the code reader 10 is connected to the vehicle computer network 30, at step 102. This preferably provides power to the code reader 10 and begins execution of code, at step 104. In the alternative, the code reader 10 is connected to the vehicle computer network 30 and turned on. First, at step 104, the processor system initializes the code reader 10. The initialization of processor systems like processor system 12 and associated devices 14, 16, 18 is known to those in the art. Next, at 106, the processor waits for a user to initiate the code reading process via the user input device(s) 18, e.g., by the user actuating a READ button or LINK button (not shown). In response, the processor 12 causes the communications circuit 14 to establish a communications link with the vehicle computer network 30, at 108. The communications link is preferably established and maintained using the processes disclosed in copending application Ser. No. 60/295,318, filed on Jun. 1, 2001, and entitled "Scan Tool With Dropped Communications Detection and Recovery and Improved Protocol Selection," which is hereby incorporated by reference. If any OBD II modules are detected, at step 110, the processor 12 causes the communications circuit 14 to request data from the module(s), stores any data transmitted to the code reader 10 by the module(s), and displays via display 16 that one or more codes were retrieved. Next, at 112, the user selects an OBD II code for display. In response, the processor at 114 reads from a memory internal to the processor system 12 or reads from one or more optional additional storage devices (not shown) the textual diagnosis description corresponding to the selected OBD II code (or other diagnostic code) from a lookup table containing a plurality of textual diagnosis descriptions sorted by OBD II code (or other diagnostic code), and then the processor displays that text via the display 16. This display of textual diagnosis descriptions by a code reader is one important aspect of the present invention.

As mentioned above, the display 16 preferably has fewer display characters available to display the textual diagnosis descriptions corresponding to some of the OBD II codes (some of the textual diagnosis descriptions have more than 130 characters), which significantly reduces the cost of the unit. Thus, another important aspect of the present invention is how the code reader 10 of the present invention displays the textual diagnosis descriptions corresponding to a selected OBD II code or other diagnostic code. In general, the code reader 10 of the present invention preferably displays textual diagnosis descriptions using a scrolling or streaming display. Herein, "scrolling" means appearing to move vertically, e.g., moving up or moving down and "streaming" means appearing to move horizontally, e.g., moving left or right. The available region of characters (e.g., 1×16 or 1×20 or 2×16 or 2×20 character blocks) of display 16 can be thought of as a window that slides with respect to a given textual diagnosis description, allowing only a subset of the characters in that textual diagnosis description to be displayed at a given point in time. The present invention contemplates both automatically scrolling displays and manually scrolling displays, and automatically streaming displays and manually streaming displays.

Scrolling displays are preferably sectioned into a plurality of display portions, each of which are sized for display on the available characters of display 16. These display portions preferably are shifted so that they appear to move from bottom to top, with new display portions entering from the bottom and previously displayed characters exiting at the top. Streaming displays preferably involve creating an appearance that the characters of the textual diagnosis description shift from the left to the right, with new characters entering from the right and previously displayed characters exiting at the left. Of course, it is also possible to have a display of a textual diagnosis description that appears to be both scrolling and streaming, e.g., a two-line scrolling display that wraps from one line to the other would appear to have both scrolling elements and streaming elements. In the automatically scrolling displays, each display portion is displayed in a certain region for a period of time. In the manually scrolling displays, each display portion is displayed at a certain region until the user indicates via user interface 18 a desire to have the next portion displayed, e.g., by actuating a specific button. In the automatically streaming displays, the characters in the textual diagnosis description are sequentially shifted after a period of time. In the manually streaming displays, the characters in the textual diagnosis description are sequentially shifted in response to the user indicating via user interface 18 a desire to have the display stream, e.g., by actuating a specific button.

For example, a scrolling display of the textual diagnosis description "Evaporative Emission Control System Purge Control Valve Circuit Malfunction" could be displayed (scrolled) on a 2×20 character display by dividing it into three display portions, as follows:

| Scroll Display Cycle | Display Portion for Display on a 2 × 20 Character Display |
|---|---|
| 1 | Evaporative Emission Control System Purge |
| 2 | Control System Purge Control Valve |
| 3 | Control Valve Circuit Malfunction |

Sequentially displaying the various display portions creates an appearance that the textual information is scrolling up.

As to the streaming displays, a scrolling display of the textual diagnosis description "Intake Air Temperature Circuit High Point" could be displayed on a 1×16 character display by shifting the characters as follows:

| Stream Display Cycle | Display on a 1 × 16 alphanumeric display. |
|---|---|
| 1 | Intake Air Tempe |
| 2 | ntake Air Temper |
| 3 | take Air Tempera |
| 4 | ake Air Temperat |
| 5 | ke Air Temperatu |
| 6 | e Air Temperatur |
| 7 | Air Temperature |
| 8 | Air Temperature |
| 9 | ir Temperature C |
| 10 | r Temperature Ci |
| 11 | Temperature Cir |
| 12 | Temperature Circ |
| 13 | emperature Circu |
| 14 | mperature Circui |
| 15 | perature Circuit |
| 16 | erature Circuit |
| 17 | rature Circuit H |
| 18 | ature Circuit Hi |
| 19 | ture Circuit Hig |
| 20 | ure Circuit High |
| 21 | re Circuit High |
| 22 | e Circuit High P |
| 23 | Circuit High Po |
| 24 | Circuit High Poi |
| 25 | ircuit High Poin |
| 26 | rcuit High Point |
| 27 | cuit High Point |
| 28 | uit High Point |
| 29 | it High Point |
| 30 | t High Point |
| 31 | High Point |
| 32 | High Point |
| 33 | igh Point |
| 34 | gh Point |
| 35 | h Point |
| 36 | Point |
| 37 | Point |
| 38 | oint |
| 39 | int |
| 40 | nt |
| 41 | t |
| 42 | |
| | * * * * * |

Sequentially displaying the display portions in the order shown above creates an appearance that the textual information is streaming from right to left.

Figure 3:
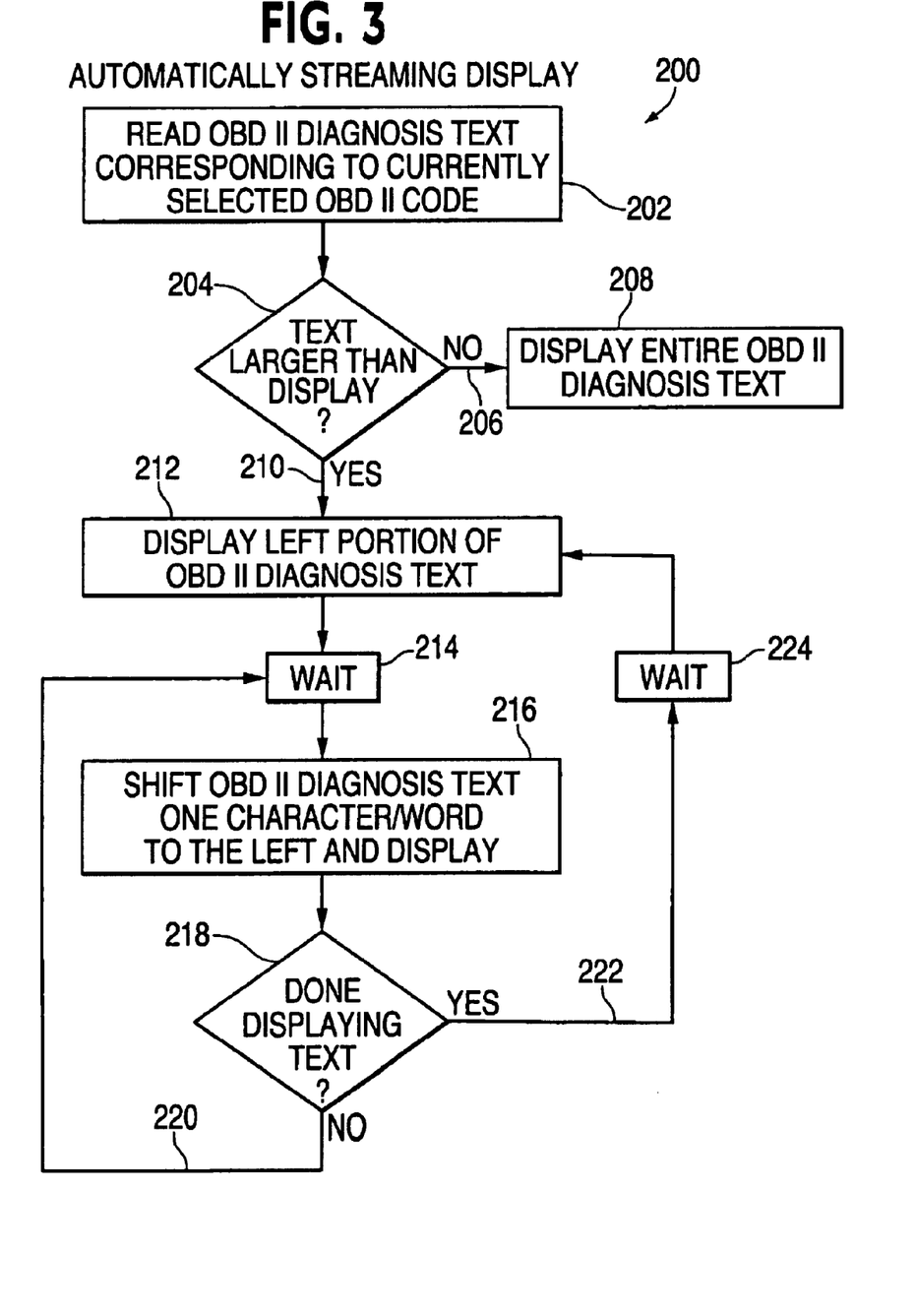
FIGS. 3 and 4 are medium-level flow charts showing the novel methods used by the code reader of the present invention to display OBD II textual diagnosis descriptions on a display that has fewer display characters than the number of characters in the OBD II textual diagnosis descriptions being displayed.

Referring now to FIG. 3, a medium-level flow chart 200 showing the code executed by processor 12 to generate a streaming display is shown. At this point, an OBD II code has been selected by the user via the input device(s) 18. The processor code begins at 202 with the processor reading from a memory internal to the processor system 12 or reading from one or more optional additional storage devices (not shown) the textual diagnosis description corresponding to the selected OBD II code from a lookup table containing a plurality of textual diagnosis descriptions sorted by OBD II code. Next, at 204, the processor determines whether the number of characters in the textual diagnosis description corresponding to the selected OBD II code exceeds the number of characters of display 16 available to display that textual diagnosis description. If not, then the textual diagnosis description is short enough to be displayed without streaming or scrolling and so code branches, at 206, and the entire textual diagnosis description corresponding to the selected OBD II code is displayed at the same time, at 208. On the other hand, if the number of characters in the textual diagnosis description corresponding to the selected OBD II code does exceed the number of characters of display 16 available to display that textual diagnosis description, the code continues at 210. Next, at 212, the processor determines and displays the leftmost portion of that textual diagnosis description sized the same as the available display. In the table immediately above, the leftmost portion of that textual diagnosis description sized the same as the available display is "Intake Air Tempe" (stream display cycle #1 in that table), i.e., for a 1×16 display, the left-most 16 characters of the textual diagnosis description "Intake Air Temperature Circuit High Point." Next, at 214, the processor waits a period of time to allow the user to see the display. A wait of about 250–300 milliseconds at step 214 is believed to be an acceptable balance between making the user wait too long and having the display move too quickly to be read. After waiting at 214, the processor next determines and displays the next portion of the textual diagnosis description by shifting the textual diagnosis description one character to the left (e.g., stream display cycle #2, above). This can also be thought of as moving an n-character window (in this example, n=16) one character to the right relative to the textual diagnosis description.

Next, at task 218, the processor determines if the textual diagnosis description corresponding to the selected OBD II code has been satisfactorily displayed. If not, at 220, the code branches back to the wait at 214, the next shift at 216 and the test at 218. Whether the textual diagnosis description corresponding to the selected OBD II code has been satisfactorily displayed is principally a matter of personal taste. There are a number of tests that can be used to determine if the textual diagnosis description corresponding to the selected OBD II code has been satisfactorily displayed. For example, at stream display cycle #42 above, the entire textual diagnosis description has been displayed and has streamed off of the available characters of display 16, which is certainly sufficient to deem that the textual diagnosis description corresponding to the selected OBD II code has been satisfactorily displayed. That said, one need not wait until the entire textual diagnosis description has been displayed and has streamed off of the available characters of display 16. As another example, at stream display cycle #26 above, the right end of the textual diagnosis description has just been displayed, but has not yet streamed off of display 16, which might be sufficient to deem that the textual diagnosis description corresponding to the selected OBD II code has been satisfactorily displayed. As yet another example, at stream display cycle #32 above, the entire textual diagnosis description has been displayed, and only complete words remain displayed. This might be sufficient to deem that the textual diagnosis description corresponding to the selected OBD II code has been satisfactorily displayed. As a final example, at stream display cycle #37 above, the entire textual diagnosis description has been displayed, and only a single complete word remains displayed. This might be sufficient to deem that the textual diagnosis description corresponding to the selected OBD II code has been satisfactorily displayed. Other arbitrary or even random tests can be used to determine if the textual diagnosis description corresponding to the selected OBD II code has been satisfactorily displayed; however, it is contemplated that this point will not be reached until at least all the characters in the textual diagnosis description have been displayed (e.g., stream display cycle #26 above in the streaming example, and scroll display cycle #4).

No matter what test is used at 218 to determine whether the textual diagnosis description corresponding to the selected OBD II code has been satisfactorily displayed, once that test is met, the code branches at 222. Next at 224, the processor preferably waits again (especially if the display streaming was stopped prior to the entire textual diagnosis description streaming off to the left, cycle #42) and then begins the display process for that textual diagnosis description again, at 212. This cycle repeats itself until the user does something to interrupt the display, e.g., the user selects a different OBD II code, in which the code branches back to step 202, or the user hits the READ button again to initiate the link and read cycle (FIG. 2). A wait of about 250–300 milliseconds at step 224 is believed to be an acceptable balance.

Figure 4:
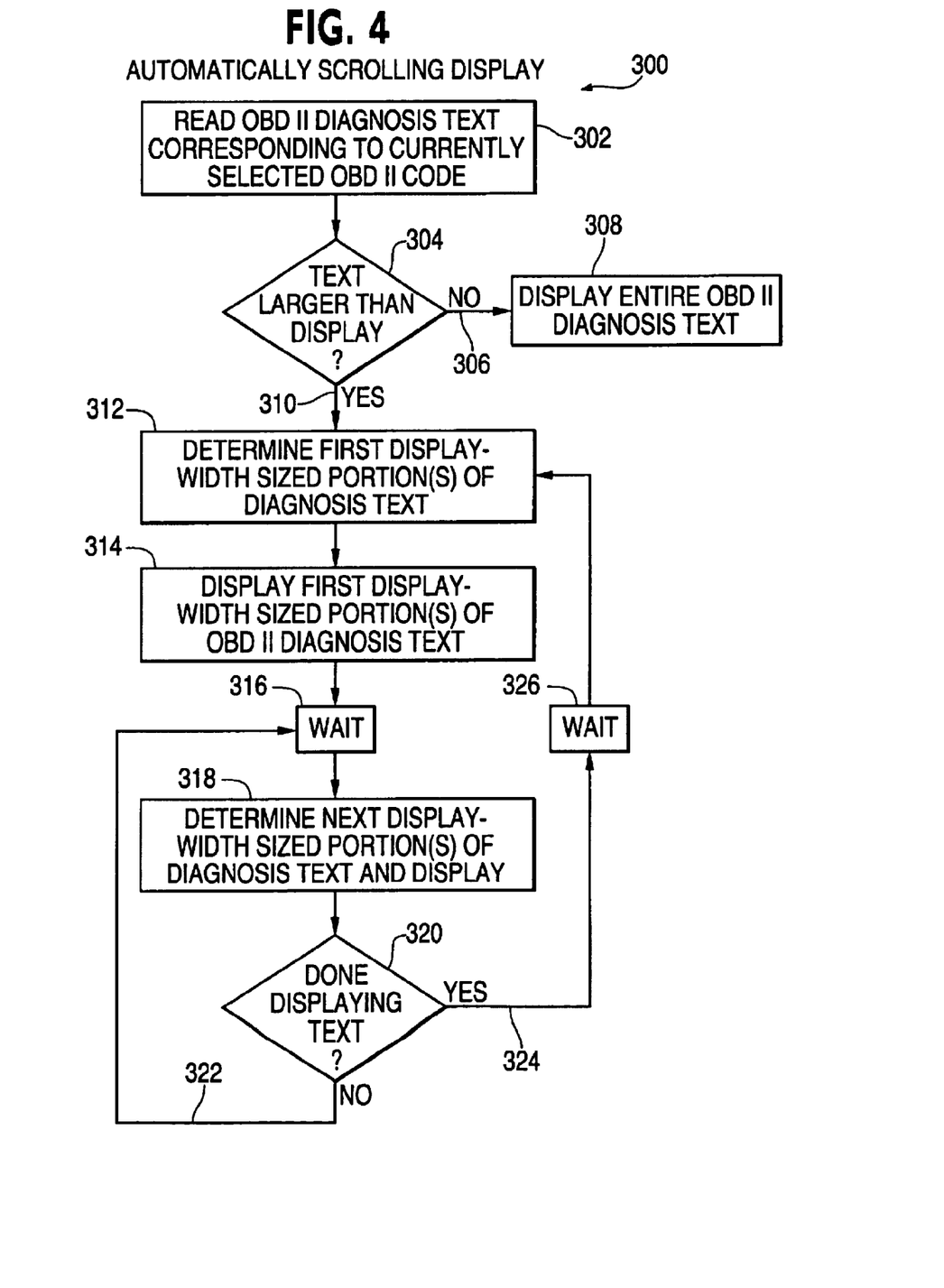

Referring now to FIG. 4, a medium-level flow chart 200 showing the code executed by processor 12 to generate a scrolling display is shown. At this point, an OBD II code has been selected by the user via the input device(s) 18. The code begins at 302 with the processor reading from a memory internal to the processor system 12 or reading from one or more optional additional storage devices (not shown) the textual diagnosis description corresponding to the selected OBD II code from a lookup table containing a plurality of textual diagnosis descriptions sorted by OBD II code. Next, at 304, the processor determines whether the number of characters in the textual diagnosis description corresponding to the selected OBD II code exceeds the number of characters of display 16 available to display that textual diagnosis description. If not, then the textual diagnosis description is short enough to be displayed without streaming or scrolling and so code branches, at 306, and the entire textual diagnosis description corresponding to the selected OBD II code is displayed at the same time, at 308. On the other hand, if the number of characters in the textual diagnosis description corresponding to the selected OBD II code does exceed the number of characters of display 16 available to display that textual diagnosis description, then code continues at 310. Next, at 312, the processor determines a first portion of that textual diagnosis description having the same width as the available display. In the scrolling example above, the first display-width sized portion(s) are "Evaporative Emission" and "Control System Purge" for the 2×20 example (scroll display cycle #1). Next, at 314, the processor displays the portion(s) determined in the previous step. Then, at 316, the processor waits a period of time to allow the user to see the display. A wait of about 250–300 milliseconds at step 314 is believed to be an acceptable balance between making the user wait too long and having the display move too quickly to be read. After waiting at 316, the processor next at 318 determines and displays the next display-width sized portion(s) of the textual diagnosis description (see e.g., scroll display cycles #2–#3 for the 2×20 example, above). This example can also be thought of as moving a 2×20-character window one row down relative to the textual diagnosis description divided into display-width portions:

| |
|---|
| Evaporative Emission Control System Purge Control Valve Circuit Malfunction |

Then, at task 320, the processor determines if the textual diagnosis description corresponding to the selected OBD II code has been satisfactorily displayed. If not, at 222, the code branches back to the wait at 316, displaying the next portion at 318, and the test at 320. Whether the textual diagnosis description corresponding to the selected OBD II code has been satisfactorily displayed is principally a matter of personal taste. That said, with the scrolling display, there are really a limited number of tests that can be used to determine if the textual diagnosis description corresponding to the selected OBD II code has been satisfactorily displayed, e.g., once the last display-width portion has been displayed, which is certainly sufficient to deem that the textual diagnosis description corresponding to the selected OBD II code has been satisfactorily displayed. As another example, as with the streaming display, one might prefer to have the textual diagnosis description continue to scroll until it appears to have scrolled off the available region of display 16.

No matter what test is used at 320 to determine whether the textual diagnosis description corresponding to the selected OBD II code has been satisfactorily displayed, once that test is met, the code branches at 324. Next at 326, the processor preferably waits again (especially if the display streaming was stopped prior to the entire textual diagnosis description scrolling off) and then begins the display process for that textual diagnosis description again, at 312. This cycle repeats itself until the user does something to interrupt the display, e.g., the user selects a different OBD II code, in which the code branches back to step 302, or the user hits the READ button again to initiate the link and read cycle (FIG. 2). A wait of about 250–300 milliseconds at step 326 is believed to be an acceptable balance.

FIGS. 3 and 4 and the accompanying text are directed toward the automatic displays. To implement the manual versions thereof, the processor waits at steps 214, 224, 316, and 326 until the user indicates via the input device(s) 18 that the user desires the display to stream or scroll, e.g., by activating a specific button, rather than the processor waiting a specific period of time.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art, for example, using fiber optic or wireless protocols. As another example, diagnostic codes other than OBD II codes may be obtained and displayed. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A code reader for reading and displaying diagnostic codes, comprising:
   (a) a processor;
   (b) a communications circuit in circuit communication with said processor, said communications circuit for generating a communications link with a vehicle diagnostic system and reading at least one diagnostic code from the vehicle diagnostic system, said at least one diagnostic code having a corresponding textual diagnosis description formed by a number of characters; and
   (c) a display in circuit communication with said processor, wherein the display has fewer display characters available than required to display the number of characters that form the corresponding textual diagnosis description; and
   (d) wherein said processor executes code to display at least a portion of the textual diagnosis description corresponding to the at least one diagnostic code on said display.

2. A code reader for reading and displaying diagnostic codes according to claim 1, wherein said code causes said processor to automatically stream other portions of the textual diagnosis description so as to present an automatically streaming display of the textual diagnosis description.

3. A code reader for reading and displaying diagnostic codes according to claim 1, wherein said code causes said processor to automatically scroll other portions of the textual diagnosis description so as to present an automatically scrolling display of the textual diagnosis description.

4. A code reader for reading and displaying diagnostic codes according to claim 1, wherein said code causes said processor to accept inputs from a user interface that permits the user to manually stream other portions of the textual diagnosis description.

5. A code reader for reading and displaying diagnostic codes according to claim 1, wherein said code causes said processor to accept inputs from a user interface that permits the user to manually scroll other portions of the textual diagnosis description.

6. A code reader for reading and displaying diagnostic codes according to claim 5, wherein said code causes said processor to sequentially display the other portions of the textual diagnosis description on said available display region in such a way that it appears to be scrolling upwards.

7. A code reader for reading and displaying diagnostic codes according to claim 5, wherein said code causes said processor to sequentially display the other portions of the textual diagnosis description on said available display region in such a way that it appears to be streaming from right to left.

8. A code reader for reading and displaying diagnostic codes, comprising:
   (a) a processor;
   (b) a communications circuit in circuit communication with said processor, said communications circuit for generating a communications link with a vehicle diagnostic system and reading at least one diagnostic code from the vehicle diagnostic system, said at least one diagnostic code having a corresponding textual diagnosis description formed by a number of characters; and
   (c) a display in circuit communication with said processor, wherein the display has fewer display characters available than required to display the number of characters that form the corresponding textual diagnosis description; and (d) wherein said processor executes code to automatically display at least a portion of the textual diagnosis description corresponding to the at least one diagnostic code on said display.

9. A code reader for reading and displaying diagnostic codes according to claim 8, wherein said code causes said processor to automatically stream other portions of the textual diagnosis description so as to present an automatically streaming display of the textual diagnosis description.

10. A code reader for reading and displaying diagnostic codes according to claim 8, wherein said code causes said processor to automatically scroll other portions of the textual diagnosis description so as to present an automatically scrolling display of the textual diagnosis description.

11. A code reader for reading and displaying diagnostic codes, comprising:

(a) a processor;

(b) a communications circuit in circuit communication with said processor, said communications circuit for generating a communications link with a vehicle diagnostic system and reading at least one diagnostic code from the vehicle diagnostic system, said at least one diagnostic code having a corresponding textual diagnosis description formed by a number of characters; and (c) a display in circuit communication with said processor, said display circuit having an available display region having fewer display characters available to display the textual diagnosis description corresponding to the at least one diagnostic code than the number of characters forming the textual diagnosis description corresponding to the at least one diagnostic code; and (d) wherein said processor executes code to automatically display the textual diagnosis description corresponding to the at least one diagnostic code on said available display region of said display having fewer display characters available to display the textual diagnosis description than the number of characters forming the textual diagnosis description, said code causing said processor to:

(i) automatically determine and display an initial portion of the textual diagnosis description on said available display region of said display having fewer display characters available to display the textual diagnosis description than the number of characters forming the textual diagnosis description; and (ii) automatically sequentially display other portions of the textual diagnosis description on said available display region of said display having fewer display characters available to display the textual diagnosis description than the number of characters forming the textual diagnosis description.

12. A code reader for reading and displaying diagnostic codes according to claim 11, wherein said code causes said processor to sequentially display the other portions of the textual diagnosis description on said available display region in such a way that it appears to be scrolling upwards.

13. A code reader for reading and displaying diagnostic codes according to claim 11, wherein said code causes said processor to sequentially display the other portions of the textual diagnosis description on said available display region in such a way that it appears to be streaming from right to left.

14. A code reader for reading and displaying diagnostic codes, comprising:

(a) a processor;

(b) a communications circuit in circuit communication with said processor, said communications circuit for generating a communications link with a vehicle diagnostic system and reading at least one diagnostic code from the vehicle diagnostic system, said at least one diagnostic code having a corresponding textual diagnosis description formed by a number of characters;

(c) a memory in circuit communication with said processor, said memory having stored thereon a lookup table containing a plurality of textual diagnosis descriptions, each having an associated diagnostic code;

(d) a display in circuit communication with said processor, said display circuit having an available display region having fewer display characters available to display the textual diagnosis description corresponding to the at least one diagnostic code than the number of characters forming the textual diagnosis description corresponding to the at least one diagnostic code; and (e) wherein said processor executes code to automatically display the textual diagnosis description corresponding to the at least one diagnostic code on said available display region of said display having fewer display characters available to display the textual diagnosis description than the number of characters forming the textual diagnosis description, said code causing said processor to:

(i) cause said communications circuit to generate a communications link with the vehicle diagnostic system and read at least one diagnostic code from the vehicle diagnostic system;

(ii) automatically read from said memory at least one textual diagnosis description corresponding to the at least one diagnostic code read from the vehicle diagnostic system;

(iii) automatically determine and display an initial portion of the textual diagnosis description on said available display region of said display having fewer display characters available to display the textual diagnosis description than the number of characters forming the textual diagnosis description; and (iv) automatically sequentially display other portions of the textual diagnosis description on said available display region of said display having fewer display characters available to display the textual diagnosis description than the number of characters forming the textual diagnosis description.

15. A code reader comprising:

(a) a housing at least partially retaining;

(1) communication circuitry for linking with a vehicle diagnostic system and for obtaining one or more trouble codes;

(2) memory comprising logic for storing one or more textual descriptions corresponding to the one or more trouble codes, the textual descriptions comprising a plurality of characters;

(3) a display, having fewer available characters then is required to display the trouble code and the entire corresponding textual description; and (4) a processor, wherein the processor is in circuit communication with the communication circuitry, the memory, and the display.

16. The code reader of claim 15, wherein the memory further comprises logic to cause the processor to display the diagnostic trouble code and a portion of the corresponding textual description.

17. The code reader of claim 16, wherein the memory further comprises logic to cause the processor to display an additional portion of the corresponding textual description.

18. The code reader of claim 17, wherein the logic to cause processor to display an additional portion of the corresponding textual description includes logic to automatically display the additional portion of the corresponding textual description.

19. The code reader of claim 18, wherein the logic to cause processor to display an additional portion of the corresponding textual description includes logic to receive an input to cause the processor to display the additional portion of the corresponding textual description.

20. The code reader of claim 19, wherein the input comprise one or more input keys.

21. The code reader of claim 20, wherein the one or more input keys are arrow keys.

22. The code reader of claim 15, wherein the display comprises an n character by m line liquid crystal display, wherein n and m are numerical values.

23. The code reader of claim 15, wherein the communications circuitry further comprises an OBD connector.

24. The code reader of claim 23 wherein the OBD connector is one of an OBIO I connector or an OBD II connector.

25. A method of displaying diagnostic trouble codes and their corresponding textual description on a hand-held code reader wherein the hand-held code reader has a display with fewer characters available then required to display the trouble code and its corresponding textual description comprising:

receiving at least one trouble code;

obtaining a textual description that corresponds to the at least one trouble code;

displaying the trouble code and a first portion of the textual description on a first display; and displaying a second portion of the textual description on a second display, wherein the first and second displays differ by at least one character.

* * * * *

UNITED STATES PATENT AND TRADEMARK OFFICE
CERTIFICATE OF CORRECTION

| | |
|---|---|
| PATENT NO. | : 7,069,125 B2 |
| APPLICATION NO. | : 10/201538 |
| DATED | : June 27, 2006 |
| INVENTOR(S) | : Hamid Namaky et al. |

Page 1 of 1

It is certified that error appears in the above-identified patent and that said Letters Patent is hereby corrected as shown below:

<u>Column 16</u>

Line 4, please replace "OBIO" with --OBD--.

Signed and Sealed this

Twenty-ninth Day of August, 2006

JON W. DUDAS
*Director of the United States Patent and Trademark Office*